Oct. 28, 1958  S. I. ROUDEBUSH  2,857,951
TUBELESS TRUCK TIRE
Filed Feb. 9, 1954
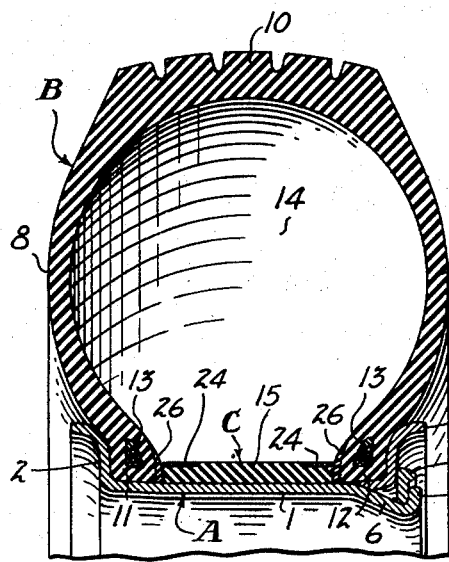
Fig. 1
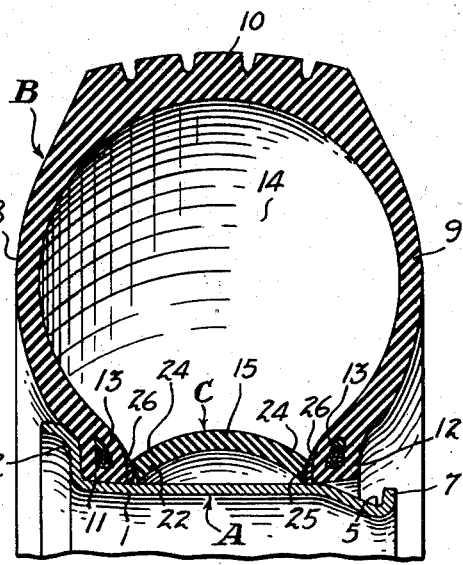
Fig. 2
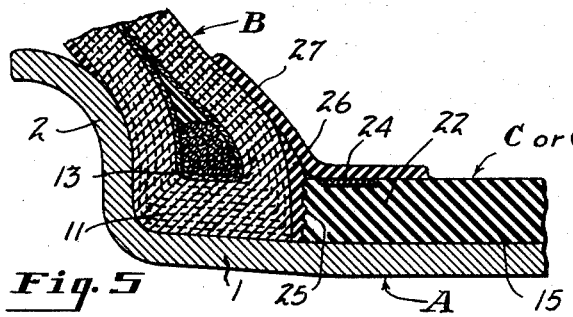
Fig. 5
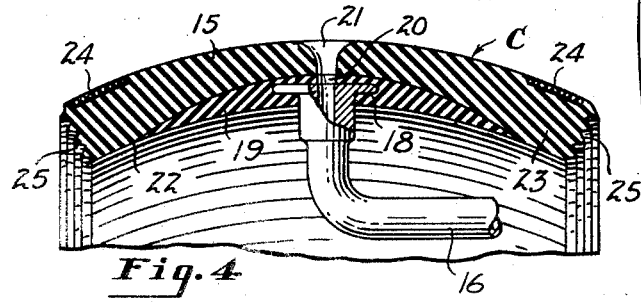
Fig. 4
Fig. 6
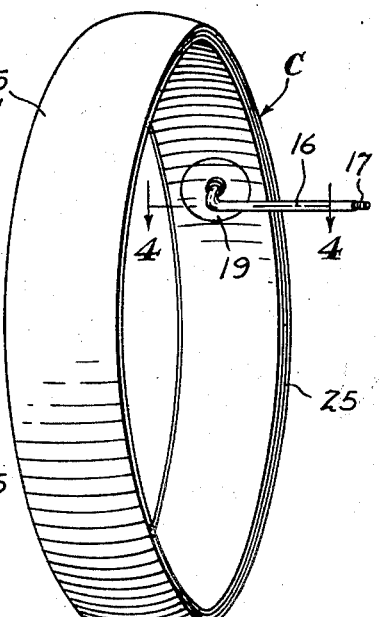
Fig. 3
INVENTOR
Samuel I. Roudebush
BY Evans & McCoy
ATTORNEYS

United States Patent Office 2,857,951
Patented Oct. 28, 1958

2,857,951

TUBELESS TRUCK TIRE

Samuel I. Roudebush, Akron, Ohio, assignor to The General Tire and Rubber Company, Akron, Ohio, a corporation of Ohio Application February 9, 1954, Serial No. 409,157

5 Claims. (Cl. 152—363)

The present invention relates to a tubeless tire having a rim-engaging sealing ring extending between the beads of the tire to prevent leakage of air from the interior of the tire and particularly relates to heavy-duty tubeless truck tires mounted on demountable rims.

It is standard practice to mount straight-side tires with inextensible beads on the one-piece straight-side rims of the ordinary automobile of today. With the drop-center rims provided on the ordinary automobile, it is possible to pull the inextensible beads of an ordinary tire over the flange rings of the rim even though these flange rings are integral with and not detachable from the rim.

Recently tubeless tires have been used on such one-piece drop-center rims, means being provided to prevent leakage of air between the inextensible beads of the tire and the flange rings of the rim. However, such a tire will go flat if the rim is cracked or otherwise permits leakage of air between the beads of the tire.

Since the rim must be air tight for satisfactory use with ordinary type of tubeless tire, it has been heretofore impracticable to use tubeless tires on large trucks. Such trucks require a large heavy-duty tire which cannot easily be mounted on a one-piece drop-center rim due to its stiffness and size. As a practical matter, such heavy-duty tires can be used only on demountable rims having detachable flanges and are usually used on rims having a cylindrical central portion and a detachable flange ring which may be removed to permit sliding of the tire axially. Since air leaks around the detachable flange ring of the demountable rim, it was heretofore thought that heavy-duty truck tire required an inner tube to prevent leakage of air from the interior of the tire to the rim.

According to the present invention the inner tubes may be eliminated in such heavy duty truck tires and all the advantages of the tubeless tire may be obtained. The inner tube is replaced by a simple and inexpensive flexible sealing ring which may easily be mounted on the cylindrical central portion of the demountable rim between the inextensible beads of the tire. The sealing ring may be arched when the tire is deflated to facilitate positioning, attachment, or removal of the detachable flange ring of the rim. However, when the tire is inflated the air pressure on the ring effects a toggle-like action on the arched ring to extend the same axially. The axial length of the sealing ring when so extended is greater than the normal distance between the beads of the tire when they are positioned against the flange rings of the rim whereby the beads are compressed against the flange rings.

The sealing ring is preferably constructed as a single piece of rubber with serrations at its opposite ends which when compressed against the inner surface of each tire bead forms an air-tight seal. If desired the inner surface of each bead may be provided with a layer of soft deformable rubber to form a more effective seal when engaged by the serrations of the sealing ring.

To facilitate removal and replacement of the tire, it is preferable to provide a sealing ring that automatically moves to an arched position and contracts axially when the tire is deflated. As herein shown the sealing ring is formed as a single rubber annulus that is normally arched in cross section. Since the rubber annulus is resilient it resumes the arched position whenever pressure is removed therefrom. If desired the opposite end portions of the rubber annulus may be made inextensible by the use of cord reinforcement or the like to insure proper positioning of the annulus on the rim during assembly and to resist centrifugal force.

An object of the present invention is to provide a simple and inexpensive sealing ring for conventional types of heavy-duty truck tires to replace the inner tubes ordinarily used on said tires.

Further objects of the invention are to provide a tubeless tire for a rim having a detachable flange and to provide a sealing ring which may easily be mounted on and removed from such a rim.

Still further objects, uses and advantages will appear from the following description and from the drawings in which:

Figure 1 is a fragmentary transverse sectional view on a reduced scale showing the tubeless tire of the present invention inflated and in operating position on the rim;

Fig. 2 is a fragmentary transverse sectional view on a reduced scale of the same tire after it has been deflated and the detachable flange has been removed from the rim;

Fig. 3 is a perspective view on a reduced scale of the rubber sealing ring shown in Figs. 1 and 2;

Fig. 4 is a fragmentary sectional view on a larger scale of the sealing ring taken on the line indicated at 4—4 in Fig. 3;

Fig. 5 is a fragmentary transverse sectional view on the same scale as Fig. 4 showing the tubeless tire and rim of Fig. 1 modified by the addition of a thin circumferential rubber strip for connecting the sealing ring to the tire casing; and Fig. 6 is a fragmentary sectional view on the same scale as Figs. 4 and 5 of a modified form of sealing ring which may be used with the rim and tire casing of Figs. 1, 2 and 6.

Referring more particularly to the drawings in which like parts are referred to by the same numerals throughout the several views, Figure 1 shows a conventional straight-side rim A for supporting a heavy-duty tire on the wheel of a large truck.

The rim comprises a substantially cylindrical central portion 1 and annular tire-retaining end portions extending radially outwardly therefrom to form axially inner and outer continuous flange rings 2 and 3. The inner side ring 2 is integral with the rim, and the outer ring 3 is detachable from the rim to permit sliding of the tire axially over the cylindrical portion 1. The continuous removable side ring 3 is held in position on the rim by a transversely cut circumferential locking ring 4 in a conventional manner well understood in the art. The locking ring is supported on the rim within a circumferential ring-retaining groove or recess 5 formed by a depressed frusto-conical portion 6 and an upturned annular flanged portion 7, the ring 4 being pressed tightly against the outer flanged portion 7 by the detachable tire-retaining flange ring 3 when the tire is inflated. It will be understood that any suitable split locking ring may be employed in the groove 5, but that such a locking ring preferably has a normal internal diameter equal to that of said groove and is held in place by its own contraction and/or the pressure of the beads against the flange 7.

The external diameter of the portion 7 is equal to or slightly less than the internal diameter of the detachable flange ring 3 and is less than the external diameter of the cylindrical portion whereby the locking ring and the tire may be mounted on or removed from the rim by sliding the same axially over the portion 7 and the split locking ring may be inserted in or removed from the recess by springing the ring over the portion 7.

The demountable rim illustrated in the drawings is not shown in great detail, it being understood that any suitable demountable rim may be used.

A rim of this type having a detachable side flange is ordinarily used to support a heavy-duty truck tire utilizing an inner tube, the pressure within the tube holding the beads of the tire against the flange rings of the rim and maintaining the detachable flange ring and the locking ring in proper position. However, according to the present invention the inner tube of such a heavy-duty tire may be omitted and replaced by a simple and inexpensive flexible sealing ring which extends between the beads of the tire to form an air-tight closure. Such a sealing ring is particularly advantageous since it permits the use of tubeless truck tires on conventional rims without substantially changing the structure of the tire casings or the manufacturing methods used in making casings.

Figures 1 and 2 show a straight-side heavy-duty truck tire B on a reduced scale. Such a rubber tire is usually reinforced by ten or more plies of cord fabric and may have one or more braided wire cables in each bead to prevent stretching of the bead after extensive use. The tubeless tire illustrated in Figs. 1, 2 and 5 comprises a fabric-reinforced casing having circumferential side wall portions 8 and 9, an annular tread portion 10 therebetween, and inextensible annular beads 11 and 12 at the edges of said wall portions which engage the cylindrical portion 1 and the flange rings 2 and 3 of the rim A. The interior portion of the beads 11 and 12 is formed by inextensible annular wire cables 13 which are surrounded in a conventional manner by the fabric-reinforced rubber of the beads as shown in Fig. 5.

Toggle-like sealing means C is provided between the inextensible bead portions of the tire B to form an air-tight substantially toroidal air chamber 14 surrounding the rim A. The sealing means acts like a toggle when subjected to the air under pressure within the chamber 14 and extends axially until the axial length thereof is greater than the normal distance between the beads 11 and 12 when the beads engage the flange rings 2 and 3. When the tire is deflated, the sealing means may be arched transversely to contract the same axially so as to relieve the pressure on the detachable flange ring 3 and the locking ring 4 and facilitates their removal or replacement.

As herein shown the sealing means C comprises a continuous, flexible, incompressible rubber sealing ring or annulus 15 of uniform axial width which, when the tire is inflated, is pressed against the cylindrical portion 1 of the rim and the axially inner faces of the beads 11 and 12 to form air-tight seals between said bead faces and said sealing ring as shown in Figs. 1 and 5. When in the position shown in these figures, the air pressure on the radially outer surface of the imperforate sealing ring 15 maintains the ring in an axially extended position wherein the axial width of the ring is greater than the normal distance between the beads 11 and 12 and the beads are forced against the flange rings 2 and 3 of the rim. The sealing ring is preferably of such a length that it has a substantailly cylindrical inner surface as shown in Fig. 1 when in such an extended position so that substantially all of said inner surface engages the cylindrical portion 1 of the rim whereby, due to the toggle-like action, the air pressure required to maintain the sealing ring in said extended position is less than that originally required to move the ring to that position.

As herein shown the sealing ring 15 is rectangular in cross section throughout its circumference when in such an extended position and exerts sufficient force on a sufficiently large area of the beads of the tire B to maintain an air-tight seal which effectively prevents leakage of air from the toroidal chamber 14. Figures 1, 2 and 5 show a heavy-duty multiple ply 10:00–20 truck tire B having a sealing ring 15 with a uniform thickness of approximately one-half inch. Where such a sealing ring is constructed as a solid piece of rubber substantially of the type used for tread stock, its axial width when extended axially may be one-eighth of an inch or more greater than the normal distance between the beads.

The ring 15 must be impervious and sufficiently thick so that it can impose substantial axial pressure on the beads of the tire without wrinking or bending. If the rubber sealing ring is not fabric reinforced or otherwise stiffened, its thickness must be at least 5% of its axial width and is preferably at least 10% of said width as shown in the drawings. The sealing ring is normally formed from a stiff rubber with a durameter preferably from about 40 to 70 and preferably a rubber containing 25 to 70 parts of carbon black per 100 parts of natural or synthetic rubber.

Suitable inflating means are provided for supplying air under pressure to the chamber 14 and/or for removing the air therefrom. Said inflating means preferably comprises a conventional valve stem extending through the rim A to the interior of the tubeless tire B. Since the valve stem of an ordinary tire is carried by the inner tube thereof near the center of the rim, it is preferable in tubeless tires to attach a valve stem to the sealing ring 15 which replaces the inner tube so that the rims do not have to be substantially modified to receive such tubeless tires. As herein shown, an offset or bent valve stem 16 carried by the central portion of the sealing ring 15 extends from the center of said ring through a suitable slot in the rim laterally beyond the outer bead 12 of the tire so that it is easily accessible. The stem 16 is threaded at its outer end 17 and contains a conventional non-return valve (not shown) which may be manually held in open position or removed to permit deflation of the tire. The valve stem may be attached to the sealing ring in any suitable way. As shown in Fig. 4, the valve stem 16 has an annular flange 18 embedded in a tapered rubber disk or annulus 19 that fits in a similarly shaped recess in the rubber ring 15. Alined apertures 20 and 21 are provided in the disk 19 and the ring 15, respectively, to establish communication between the hollow interior of the valve stem and the chamber 14. The flange 18 is bonded to the rubber of the disk 19 by molding or vulcanization and thereafter the disk is bonded to the rubber of the sealing ring 15 in a similar manner. It will be understood that a modified form of sealing means C' as shown in Fig. 6 may also be provided with a valve stem as shown applied to the sealing means C in Fig. 4.

In order to obtain a proper toggle-like action, to insure proper positioning of the sealing ring on the rim, to avoid movement of either end portion of the sealing ring out of engagement with the cylindrical portion 1 of the rim, and to prevent stretching of the rubber after extensive use, the opposite end portions of the sealing ring are preferably made inextensible. As herein shown the sealing ring is formed as a solid rubber annulus and is provided with inextensible end portions 22 and 23 each having at least one circumferential layer of cord fabric 24 embedded in the rubber and vulcanized thereto to prevent stretching of the rubber. Each of said inextensible portions has the same internal diameter which is substantially the same as that of the beads 11 and 12 and the external diameter of the cylindrical portion 1 of the rim adjacent the beads.

As hereinabove mentioned the sealing ring may be contracted axially when the tubeless tire is deflated to facilitate mounting or removal of the tire. In order to permit such contraction, the sealing ring must be adapted to be arched transversely so that the central portion thereof has a diameter greater than that of the opposite end portions. It is preferable to provide a sealing ring that assumes such an arched axially contracted position automatically when the tire is deflated. As herein shown the sealing ring is formed as a flexible, elastic and resilient annulus which is normally arched transveresly in cross section, the extrados of the arch being radially outwardly of the intrados. Since the sealing ring is resilient and elastic, it may be deformed under radial pressure to increase its axial width and will resume its normal shape to decrease said width when such pressure is removed.

Figures 2 and 4 show the normal arched position that the sealing ring 15 assumes automatically when the tire is deflated or when the ring is removed from the rim. Since both end portions and the central portion of the ring 15 are curved to form part of a single arch, the axial or chordal width of the ring's interior rim-engaging surface may be increased a greater amount than the axial width of the interior surface of the ring when the tire is inflated. Where the end portions 22 and 23 are shaped as in Fig. 4, the axial width of the interior surface of the sealing ring is normally substantially less than that of the exterior surface. Where the ring 15 is of the size shown in Fig. 4, the axial width of the interior surface may be increased about one-quarter of an inch when the tire is inflated.

In order to reduce initial air leakage during inflation of the tire, the sealing ring preferably engages the beads of the tire when in its normal arched position. When the flange ring 3 and the locking ring 4 are properly positioned on the rim and before the tire is inflated, the arched sealing ring engages the beads of the tire and restricts the flow of air between the beads sufficiently to initiate axial extension of the sealing ring. The increased pressure of the sealing ring on the beads further restricts the flow of air and increases the air pressure on the radially outer surface of the sealing ring until the ring engages the cylindrical portion 1 of the rim as shown in Figs. 1 and 5.

In order to provide an air-tight seal between the inner faces of the inextensible bead members 11 and 12 and the opposite end edges of the sealing ring 15, it is often desirable to provide one of the members with circumferential serrations or the like or with a soft deformable sealing material which may easily be compressed to form a tight seal. The circumferential serrations are preferably provided on the sealing ring to simplify the manufacture of the tire and are preferably concentric and circumferentially continuous so as to minimize leakage.

As herein shown the opposite end edges of the rubber sealing ring 15 are provided with circumferentially-continuous concentric serrations 25. As shown in Fig. 4, the serrations are preferably formed of the same stiff incompressible solid rubber as the rest of the sealing ring 15 and are preferably adapted to exert a large axial force on the beads of the tire without substantially deforming. Such serrations can form an air-tight seal when they press against a tire bead of the type used most universally at the present time on truck tires. However, in order to reduce the axial pressure required to insure an air tight seal, it is preferable to provide a soft deformable rubber surface against which the serrations press.

As shown in Figs. 1, 2 and 5, the inner faces of the beads 11 and 12 are provided with thin circumferential layers 26 of soft rubber which are vulcanized or otherwise bonded to the remaining portion of the inextensible beads. The serrations at each end of the sealing ring 15 deform the soft rubber of each circumferential layer 26 to form an effective seal when the tire is inflated. Since the axial pressure required to obtain a good seal is reduced because of the soft rubber, the air pressure required to hold the sealing ring against the rim as in Fig. 1 is reduced and centrifugal force is less apt to arch the sealing ring. However, it will be understood that the soft rubber layers 26 may be omitted, if desired, to reduce the cost of the tire or may be bonded to the sealing ring.

Since the sealing ring 15 and the tire casing may be removed as a unit from the rim, it may be desirable to cover the air seals at the ends of the sealing ring with a thin sealing strip which is adhered to the beads and the sealing member or to otherwise connect the sealing ring to the tire casing. Figure 5 shows a modified form of the present invention wherein a thin circumferential rubber strip 27 is bonded or otherwise adhered to the sealing ring 15 and one bead 11 of the tubeless tire, the opposite bead 12 being preferably separate and detached from the sealing ring as shown in Figs. 1 and 2. The strip 27 is adhered throughout its length to the tire so that there can be no leakage of air under the strip to the serrations 25 of the end portion 22. However, the strip 27 is preferably omitted and is unnecessary to insure a tight seal.

It is often preferable to provide an arched sealing member whose serrations do not change their angular position when the member moves from its arched to its sealing position whereby a greater area of the sealing ring engages the beads when inflation of the tire is initiated. Figure 6 shows the preferred form of the sealing means C' which comprises a flexible rubber sealing ring or annulus 15' that may be constructed of the same material as the ring 15 and may be used in the same way with the rim A and the tire B as shown in Figs. 1, 2 and 5. It will be understood that the ring 15' may have a valve stem (not shown) similar to the stem 16 and may have a uniform thickness of about one-half inch. The only substantial difference between the rings 15 and 15' is in their normal cross-sectional shape. The sealing ring 15' has inextensible end portions 22' and 23' with cord fabric reinforcement 24' and concentric serrations 25' similar to the end portions 22 and 23, the fabric reinforcement 24, and the serrations 25 of the ring 15. However, the end portions 22' and 23' are cylindrical and the central portion only of the ring 15' is arched when the tire is deflated, the sealing ring being normally arched transversely and having a cross-sectional form as shown in Fig. 6 when removed from the rim. Like the ring 15 of Fig. 4, the ring 15' assumes the arched position automatically when the tire is deflated and thereby reduces its axial width. When the tire is inflated, the ring 15' becomes substantially rectangular in cross section and engages the central portion 1 of the rim like the ring 15 of Fig. 1 and otherwise functions like the ring 15 to engage the beads 11 and 12 and form an air tight closure. It will be understood that the ring 15' may have an axial width, when in the arched position and when in the axially extended position, substantially equal to the average axial width of the ring 15 when in those positions.

It is to be understood that in accordance with the provisions of the patent statutes variations and modifications of the specific devices herein shown and described may be made without departing from the spirit of the invention.

What I claim is:

1. A tubeless tire, a rim having a cylindrical central portion and annular end portions extending radially outwardly therefrom to form flanges, one of said flanges being detachable to permit sliding of said tire axially over said cylindrical portion, said tubeless tire comprising integral inextensible bead members mounted on said rim for engagement with said cylindrical portion and said flanges to position the tire on the rim, and sealing means extending between said bead members to form an airtight substantially toroidal chamber surrounding said rim, said sealing means comprising a flexible annular rubber sealing member having opposite end portions engaging said bead members adjacent said cylindrical portion, said opposite end portions having an internal diameter substantially equal to that of said bead members, said sealing member having a radial thickness not substantially less than ten percent of its axial width, circumferential serrations on one of said members, and a soft deformable rubber annulus on another of said members for engaging said serrations to form an airtight seal at opposite ends of said sealing member, said sealing member having a central portion between its end portions that may be moved toward and away from the cylindrical portion of said rim to extend and contract the sealing member axially with a toggle-like action, said sealing member being extended when the tire is inflated to a position wherein the axial width of the sealing member is greater than the distance between the beads when said beads are positioned against the rim flanges so that the sealing member presses said serrations into sealing engagement with said soft rubber annulus and forces said bead members against the flanges of said rim.

2. A straight-side rim having a cylindrical central portion with a diameter of at least fifteen inches and annular end portions extending radially outwardly therefrom to form flanges, one of said flanges being detachable to permit sliding of a tire axially over said cylindrical portion; a tubeless tire comprising annular side walls, an annular tread therebetween, and annular beads at the edges of said wall portions for engaging said cylindrical portion and said flange rings to position the tire on the rim, said beads having inextensible annular wire cables surrounded by fabric-reinforced rubber; sealing means extending between said beads radially inwardly of said cables to form an air-tight substantially toroidal chamber surrounding said rim, said chamber having a diameter of at least seven inches, said sealing means comprising a flexible rubber annulus having an average radial thickness less than three-fourths of an inch and not substantially less than ten percent of its axial width, said annulus having radially outer circumferential end portions at its opposite ends engaging intermediate portions of said bead throughout the circumference thereof to prevent leakage of air between said beads and the opposite ends of said rubber annulus and having an intermediate portion between said circumferential end portions which is arched radially outwardly in cross section in its unstressed condition; and inflating means for supplying air to said chamber to press the intermediate portion of said annulus against the cylindrical portion of the rim and to move the ends of the annulus a substantial distance axially with respect to said flanges, the intermediate portion of said annulus contracting radially and substantially increasing the axial pressure between said flange and said beads in response to inflation of the tire.

3. In a tubeless heavy-duty truck tire for a demountable rim having a detachable flange, said tire having inextensible annular beads, a sealing ring comprising a flexible resilient annulus of incompressible elastic rubber having a uniform thickness not substantially less than ten percent of said width and not substantially greater than three-fourths of an inch, said annulus in the unstressed condition having a laterally arched annular central portion and integral generally cylindrical inextensible end portions of the same internal diameter which is at least fifteen inches, the extrados of the arched portion being radially outwardly of the intrados so that the internal diameter of said arched portion is greater than the internal diameter of each of the end portions, fabric means reinforcing each of said end portions, said end portions having circumferential bead-engaging serrations, and means for inflating the tire comprising a valve stem carried by said arched portion, said annulus when subjected to radial pressure toward its axis having a toggle-like action and being deformable to a sealing position wherein the entire sealing ring is internally cylindrical and the end portions of the ring are moved axially away from each other, the pressure required to maintain the central portion in said sealing position being less than that required to move it to said position.

4. In a wheel having a demountable rim with a detachable flange, a truck tire comprising annular side walls, an annular tread therebetween, annular rim-flange-engaging beads at the edges of said side walls, said beads having inextensible annular wire cables surrounded by fabric-reinforced rubber, sealing means having an axial width to fit between said beads so as to form an enclosed toric-shaped chamber with a diameter of at least seven inches, said sealing means comprising a flexible elastic rubber annulus having a diameter of at least fifteen inches and an average radial thickness that is at least ten percent of its axial width and no more than three-fourths of an inch, said annulus in its unstressed condition having circumferential end portions for engaging the rim and having an intermediate portion between its end portions which is arched radially outwardly in cross section, said annulus when subjected to radial pressure toward its axis being deformable to a position wherein the annulus is generally internally cylindrical and having a toggle-like action to move the end portions of the annulus axially more than one-eighth of an inch away from each other, and means for inflating the tire comprising a valve stem carried by said annulus, the opposite end portions of the annulus being reinforced with fabric cords and having circumferential bead-engaging serrations for effectively sealing said chamber when the tire is inflated to press the beads against the rim flanges.

5. In a vehicle wheel having a pneumatic rubber truck tire mounted on a straight-side rim, said rim having a cylindrical central portion with a diameter of at least fifteen inches and annular end portions extending radially outwardly therefrom to form rim flanges, one of which is detachable to permit sliding of said tire axially over said cylindrical portion, said tire having a toric-shaped casing with inextensible annular beads for engaging said cylindrical portion and the rim flanges to position the tire on the rim, said beads having inextensible annular wire cables surrounded by fabric-reinforced rubber, the combination of sealing means extending between said beads radially inwardly of said cables to form an air-tight toric-shaped chamber surrounding said rim having a diameter of at least seven inches, said sealing means comprising a flexible resilient annulus of incompressible elastic rubber having a substantially unform radial thickness not substantially less than ten percent of its axial width and no more than three-fourths of an inch and having end edge portions at its opposite ends engaging intermediate portions of said bead throughout the circumference thereof to prevent leakage of air between said beads and the opposite ends of said rubber annulus, said annulus having an intermediate portion between its end edge portions that is arched radially outwardly in cross section in its unstressed condition, said annulus having a toggle-like action and when extended axially by pressure in said chamber to a cylindrical form having an axial width greater than the distance between said bead portions when they are properly positioned against the rim flanges and when in its unstressed arched position having a reduced axial width to facilitate attaching or detaching of the detachable rim flange.

References Cited in the file of this patent

UNITED STATES PATENTS

| | | |
|---|---|---|
| 1,140,752 | Leonard | May 25, 1915 |
| 2,113,031 | Merz et al. | Apr. 5, 1938 |
| 2,400,930 | Herzegh | May 28, 1946 |
| 2,674,291 | Campbell | Apr. 6, 1954 |
| 2,731,062 | Coben | Jan. 17, 1956 |
| 2,731,063 | Powers | Jan. 17, 1956 |

FOREIGN PATENTS

| | | |
|---|---|---|
| 1,026,545 | France | Feb. 4, 1953 |